US008697163B2

(12) United States Patent
Tan et al.

(10) Patent No.: US 8,697,163 B2
(45) Date of Patent: *Apr. 15, 2014

(54) REDUCTION OF SORBIC ACID PRECIPITATION BY FORMING MICROEMULSION

(75) Inventors: Siow Ying Tan, Thornwood, NY (US); Peter Given, Ridgefield, CT (US); Rama Gadiraju, Port Chester, NY (US); Cynthia Clark, Yorktown Heights, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,758

(22) Filed: Feb. 24, 2011

(65) Prior Publication Data
US 2012/0219677 A1    Aug. 30, 2012

(51) Int. Cl.
A23F 3/16    (2006.01)

(52) U.S. Cl.
USPC ...................................... 426/330.3

(58) Field of Classification Search
None
See application file for complete search history.

(56) References Cited

U.S. PATENT DOCUMENTS

| | | | |
|---|---|---|---|
| 3,021,219 A | 2/1962 | Melnick | |
| 4,399,150 A | 8/1983 | Ueno et al. | |
| 4,786,521 A | 11/1988 | Bennett et al. | |
| 4,835,002 A * | 5/1989 | Wolf et al. | 426/590 |
| 5,888,569 A | 3/1999 | Jager et al. | |
| 6,126,980 A | 10/2000 | Smith et al. | |
| 2004/0086619 A1 * | 5/2004 | Zhong et al. | 426/590 |
| 2005/0053704 A1 | 3/2005 | Kemp | |
| 2007/0054026 A1 | 3/2007 | Grenville et al. | |
| 2007/0141203 A1 | 6/2007 | Cook | |
| 2007/0275140 A1 | 11/2007 | Safko | |
| 2009/0306210 A1 | 12/2009 | Behnam | |

FOREIGN PATENT DOCUMENTS

| | | | |
|---|---|---|---|
| CN | 101810361 A | * | 8/2010 |
| DE | 26 23 682 | | 12/1976 |
| DE | 2623682 A | * | 12/1976 |
| WO | 9721359 | | 6/1997 |
| WO | WO 9721359 A1 | * | 6/1997 |
| WO | WO 2006029896 A1 | * | 3/2006 |

OTHER PUBLICATIONS

Database WPI Week 201063, Thomson Scientific AN 2010-L68981, XP002676321, dated Aug. 25, 2010.
PCT/US2012/025338, International Search Report and Written Opinion, dated May 31, 2012.
U.S. Appl. No. 13/033,777, Final Office Action mailed Aug. 29, 2012.
U.S. Appl. No. 13/034,023, Final Office Action mailed Sep. 6, 2012.
U.S. Appl. No. 13/034,097, Office Action mailed Oct. 23, 2012.
Maurice Shachman, Syrup Making—The Heart of the Process in the Soft Drinks Companion: A Technical Handbook for the Beverage Industry; Chapter 9, CRC Press 2004 http://www.crcnetbase.com/doi/pdf/10.1201/9780203492123; Accessed on May 10, 2012.

* cited by examiner

*Primary Examiner* — Humera Sheikh
*Assistant Examiner* — Subbalakshmi Prakash
(74) *Attorney, Agent, or Firm* — Banner & Witcoff, Ltd.

(57) ABSTRACT

A method for reducing sorbic acid precipitation during manufacture and storage of stable preserved syrup. A microemulsion of a sorbic acid compound, a non-aqueous solvent, and a surfactant is made in water. Syrup ingredients are added to a bulk quantity of liquid, and the microemulsion is added to the liquid.

8 Claims, No Drawings

REDUCTION OF SORBIC ACID PRECIPITATION BY FORMING MICROEMULSION

FIELD OF THE INVENTION

The invention relates to a method for incorporating sorbic acid into beverages and beverage syrup. In particular, the method relates to a method for incorporating sorbic acid into beverages and beverage syrup while minimizing the potential for sorbic acid precipitation.

BACKGROUND OF THE INVENTION

Consumer demand for refreshing beverages has led to introduction of many types of beverages. Commercial distribution of beverages requires that the beverages, and syrup from which beverages are made, be protected from spoilage if not consumed or used upon manufacture.

Beverages can be maintained under conditions that significantly retard activity of microbial and other spoilage agents, such as bacteria, molds, and fungi. Such conditions often require, for example, refrigeration until the beverage or syrup is consumed. Maintenance of such conditions often is not possible or practical.

Another method of retarding microbial activity is to add preservatives to the beverage. Many preservatives are known. However, known preservatives typically have disadvantages that limit use in beverages. For example, preservatives may impart off taste to the beverage when used in a concentration sufficient to provide preservative effect. Preservatives also may adversely affect the appearance of the beverage.

Some preservatives precipitate or form crystals or a floc under conditions of manufacture or storage of a beverage or of a syrup from which a beverage is made. Some preservatives may cloud the beverage, which is unacceptable to the consumer if the beverage is expected to be clear. Such phenomena typically are unacceptable consumers not only because of certain preconceptions relating to appearance, but also because consumers often equate cloud or particulate formation with spoilage of the beverage. Floc, crystals, or sediment or sediment-like deposits in a beverage bottle also are unacceptable to consumers because the solids typically taste bad and present an unpleasant mouthfeel (for example, a gritty or sandy mouthfeel).

Beverages often are made from concentrates that are diluted. Beverages then are provided immediately to a consumer, or are packaged for distribution and consumption. The concentrates, often called syrups, are conveniently shipped, and then used to make beverages in a one-step process. Thus, it is convenient to put all ingredients, including preservatives, into a syrup. However, because syrup is concentrated, it often is not possible to introduce compounds that have limited solubility without precipitation.

Thus, there exists a need for a preservative that does not form solids, such as floc, crystals, sediment or sediment-like deposits, or precipitates, in syrup. There also exists a need for a preservative that does not cloud an optically clear beverage. There also exists a need for a method of introducing such a preservative without inducing precipitation thereof.

BRIEF SUMMARY OF THE INVENTION

A first embodiment of the invention is directed to a method for forming a stable beverage syrup preserved with sorbic acid. In another embodiment of the invention, the stable preserved syrup has a shelf life of at least about one week, and up to about 20 weeks, at room temperature.

A third embodiment of the invention is directed to a method for forming a stable beverage preserved with sorbic acid. In another embodiment of the invention, the stable preserved beverage has a shelf life of at least about 20 weeks at a temperature between about 40° F. and about 110° F.

DETAILED DESCRIPTION OF THE INVENTION

As used herein, "syrup" or "beverage syrup" is a beverage precursor to which a fluid, typically water, is added to form a ready-to-drink beverage, or a "beverage." Typically, the volumetric ratio of syrup to water is between about 1:3 to about 1:8, more typically between about 1:4 and about 1:5. The volumetric ratio of syrup to water also is expressed as a "throw." A 1:5 ratio, which is a ratio commonly used within the beverage industry, is known as a "1+5 throw."

As used herein, "beverage" refers to beverages such as soft drinks, fountain beverages, frozen ready-to-drink beverages, coffee beverages, tea beverages, sport drinks, and alcoholic products. The beverage may be carbonated or noncarbonated. In addition, in certain embodiments of the invention, "beverage" refers also to juice, dairy, and other non-clear beverages. Beverages according to embodiments of the invention can be clear or non-clear.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.). Readings of up to about 3 NTU (Nephelometric Turbidity Units) are considered very clear, and values up to about 5 NTU can be considered clear. When such a reading is as high as around 6 to about 10 NTU, a sample is not clear, but rather very slightly hazy or slightly hazy. At about 15 NTU, a beverage is hazy. Thus, a beverage having turbidity not greater than about 5 NTU is said to be a clear beverage, with values of about 6 NTU being very slightly hazy to slightly hazy at 10 NTU.

As used herein, "stable" beverage syrup refers to syrup in which no phase separation occurs, i.e., no crystal, floc, sediment, haze, cloud, or precipitation at room temperature over a period of more than about one week, typically more than about 4 weeks, more typically more than about 10 weeks, and most typically more than about 20 weeks. As used herein, a "stable" finished beverage refers to a clear beverage in which no phase separation occurs, i.e., no crystal, floc, sediment, haze, cloud, or precipitation at room temperature at 40° F., 70° F., 90° F., and 110° F. over a period of about 10 weeks, typically for a period of more than about 20 weeks, and more typically more than about 6 months, i.e., within the typical shelf-life of the finished beverage.

A "preserved" beverage shows no significant microbiological activity during the period of stability.

As typically used herein, "water" is water, typically conditioned and treated, of a quality suitable for manufacturing beverages. Excessive hardness may induce precipitation of sorbic acid. With the guidance provided herein, the skilled practitioner will be able to provide water of sufficient quality.

"Fluid" means water and juice, dairy, or other liquid beverage products that form part of beverages. For example, dairy components may be added in quantity that does not provide sufficient hardness to induce sorbic acid precipitation. With the guidance provided herein, the skilled practitioner can determine whether addition of dairy, juice or other liquid beverage product is suitable for use in embodiments of the invention.

For brevity, the invention will be described as it relates to water as the fluid. However, the description herein also relates to fluid, as defined herein. With the guidance provided herein, the skilled practitioner will be able to provide fluids suitable for use in forming syrup.

Beverages and syrups made in accordance with embodiments of the invention typically comprise water, preservative (including sorbic acid), sweetener, pH-neutral compounds, acids and acidic compounds, and flavors and flavor compounds. These compounds typically include taste modifiers, nutrients, colors, and other compounds, such as emulsions, surfactants, buffers, and anti-foaming compounds, typically found in beverages.

Sorbic acid acts as a preservative. However, at the pH levels typically found in syrups, and at a typical sorbic acid concentration in syrup sufficient to provide commercially useful preservative activity in beverages made therefrom, sorbic acid is likely to precipitate unless steps are taken to avoid precipitation.

The inventors have discovered that precipitation of sorbic acid in syrup during manufacture of the syrup and the beverage can be avoided by forming in aqueous solution a microemulsion of sorbic acid in non-aqueous solvent with surfactant. This microemulsion then is added to the syrup or beverage. Although the inventors do not wish to be bound by theory, it is believed that the surfactant ameliorates local conditions, such as a locally low pH, that induce sorbic acid precipitation, and aids in solubilizing any sorbic acid that does precipitate.

A microemulsion is a thermodynamically stable, transparent, low viscosity, isotropic dispersion comprising oil and water stabilized by a surfactant. A second surfactant, or co-surfactant, may be used. Microemulsions typically have particle sizes ranging from about 5 nm to about 100 nm. Although the inventors do not wish to be bound by theory, it is believed that microemulsions arise from a spontaneous self-assembly of the hydrophobic and hydrophilic parts of surfactant molecules with the included compound (sorbic acid) and the non-aqueous phase. Microemulsions also can exist in the presence of excess water phase. The inventors have discovered that, even with a great excess of water phase, as would be found in a beverage, the surfactant still has the ability to maintain the solubility of the sorbic acid, even though the microemulsion no longer exists.

Microemulsions can be prepared by low-energy emulsification in the following three ways: dilution of an oil-surfactant mixture with an aqueous phase; dilution of an aqueous-surfactant mixture with an oil phase; and mixing all components together. A microemulsion also can be made by phase inversion, especially when the surfactant is an ethoxylated non-ionic surfactant. When an oil-in-water emulsion containing such a surfactant is heated, the emulsion inverts to a water-in-oil emulsion at the critical (phase inversion) temperature. Cooling with agitation yields a stable oil-in-water microemulsion. However, during phase inversion, droplet size reaches a maximum. Because larger droplets are more likely to cloud or haze a liquid product, the skilled practitioner recognizes that the phase inversion method typically would not be used to make a microemulsion in embodiments of the invention.

A non-aqueous solvent typically is used to solubilize sorbic acid as well as the surfactant. Suitable non-aqueous solvents include, without limitation, propylene glycol, ethanol, citric acid, benzyl alcohol, triacetin, limonene, vegetable oils, medium chain triglycerides, citrus flavor oils, and combinations thereof.

In an additional and optional step, a co-solvent is added to the beverage concentrate in embodiments of the invention. Such an addition is necessary when, for example, a non-aqueous solvent is employed and neither the non-aqueous solvent nor the surfactant is miscible with water. In such a situation, it is necessary to add a co-solvent that is miscible not only with water, but also with non-aqueous solvent and the surfactant. Further, addition of a co-solvent facilitates later dilution of the beverage concentrate regardless of the water miscibility of the non-aqueous solvent and the surfactant.

If a co-solvent is employed, it typically is added after the addition of surfactant. Suitable co-solvents include, without limitation, propylene glycol, ethanol, citric acid, benzyl alcohol, triacetin, limonene, and combinations thereof. In particularly preferred embodiments of the present invention, a combination of propylene glycol and ethanol, typically about a 60:40 combination, or a combination of ethanol and citric acid, typically about a 90:10 combination, is used. The co-solvent may be the same solvent or solvents used to make the non-aqueous solution containing sorbic acid. Alternatively, the co-solvent may be different. With the guidance provided herein, the skilled practitioner can readily determine the amount. Simply put, the amount must be sufficient to act as a "bridge" between water and the mixture of non-aqueous solvent plus surfactant, and typically ranges from about 15 percent to about 70 percent, more typically from about 20 percent to about 50 percent, by total weight of the sorbic acid pre-microemulsion mixture.

Polysorbate typically is used as the surfactant in embodiments of the invention. Polysorbate is a commonly known non-ionic surfactant often used in foods. Polysorbate is derived from polyethoxylated sorbitan and a fatty acid, as set forth in the following table. Polysorbate is commonly available in six grades as polysorbate 20, 40, 60, 65, 80, and 85, commercially available from suppliers. These products also are available from ICI Americas as Tween 20, 40, 60, 65, 80, and 85. The chemical formulas and HLB values of these compounds are as follows:

| Name | Formula | HLB |
| --- | --- | --- |
| Polysorbate 20 | Polyoxyethylene (20) sorbitan monolaurate | 16.7 |
| Polysorbate 40 | Polyoxyethylene (20) sorbitan palmitate | 15.6 |
| Polysorbate 60 | Polyoxyethylene (20) sorbitan stearate | 14.9 |
| Polysorbate 65 | Polyoxyethylene (20) sorbitan tri-stearate | 10.5 |
| Polysorbate 80 | Polyoxyethylene (20) sorbitan oleate | 15.0 |
| Polysorbate 85 | Polyoxyethylene (20) sorbitan trioleate | 11.0 |

Some polysorbates are reasonably soluble in water, and so can conveniently be dissolved in aqueous solutions. However, more typically, polysorbate is added to the non-aqueous phase first, thus forming a pre-microemulsion.

As the skilled practitioner recognizes, water-in-oil microemulsions typically form at HLBs between 3 and about 8, and oil-in-water microemulsions typically form at HLBs between about 8 and 18. HLB's above about 8 indicate that the molecule has greater hydrophilic character. The polysorbates typically used in embodiments of the invention have HLB values greater than about 10, and so typically form oil-in-water microemulsions.

Polysorbate typically is used as the surfactant to form a microemulsion in accordance with embodiments of the invention. Polysorbate is food-safe and well-accepted in liquids. However, other food-safe surfactants also can be used. Other suitable surfactants include, but are not limited to, sorbitan monolaurate (Span 20), sorbitan monopalmitate (Span 40), sorbitan monostearate (Span 60), sorbitan monooleate (Span 80), sucrose monomyristate, sucrose monopalmitate, sucrose palmitate/stearate, sucrose stearate, vitamin E TPGS (tocopherol propylene glycol succinate, a water-soluble form of vitamin E), dioctylsulfosuccinate sodium salt (DOSS), monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids such as decaglycerol mono-caprylate/caprate, triglycerol monooleate, decaglycerol monostearate, decaglycerol dipalmitate, decaglycerol monooleate, decaglycerol tetraoleate and hexaglycerol dioleate, $\alpha$-, $\beta$-, and $\gamma$-cyclodextrins, propylene glycol esters of fatty acids such as dicaprate esters, mono and dicaprylate ester blends and diesters of caprylate and capric acids, stearoyl lactylates, free fatty acids (typically $C_{8-18}$), and combinations thereof.

Although it is preferable to incorporate surfactants having an HLB value at least about 8 for oil-in-water microemulsion formation, often surfactants with HLB values less than about 8 are used in blends with those surfactants having higher HLB values. This technique results in enhanced performance.

As used herein, "micelle" refers to a system in which a surfactant aggregates at the molecular level. The size of a micelle is approximately about 5 to 10 nm. There is a critical minimum concentration (CMC) for a surfactant associated with micelle formation. Below the CMC, a surfactant is merely in solution; above the CMC, discrete particles or micelles spontaneously form. Thus, in embodiments of the invention, a pre-microemulsion is made. However, the pre-microemulsion reverts to a microemulsion when introduced to the syrup or beverage.

Micelles deliver sorbic acid by intercalation of the sorbic acid with the hydrophobic portion of the micelle. To act as a delivery system, it is generally required to have a molecular excess of surfactant over water-immiscible component.

To form a microemulsion and to prevent the aggregation of the oil phase, the amount of emulsifier or surfactant should exceed the critical micelle concentration and desirably is at least about one to about ten times the amount of the dispersed component composed of non-aqueous solvent plus sorbic acid. The size of droplets in a microemulsion is about 5 to about 100 nm, smaller than the wavelength of visible light (about 100 nm). Therefore, a microemulsion is clear. A microemulsion is also thermodynamically stable; forms spontaneously, i.e., the mixing sequence does not matter; and has a reversible phase change, i.e., if phase separation occurs at an elevated temperature, uniform appearance returns upon temperature decrease, although the particle size likely will have increased. In any event, if the particle size significantly exceeds about 100 nm diameter, the appearance of the beverage will become hazy or cloudy.

A microemulsion requires that the amount of a surfactant be beyond its CMC to form an emulsion. In aqueous medium, the CMC of Tween 20 is about 0.07 percent (about 700 ppm); for Tween 60, the CMC is about 0.03 percent (about 300 ppm); and for Tween 80, the CMC is about 0.015 percent (about 150 ppm). However, the concentration of surfactant in a finished beverage typically is about 5 ppm to about 15 ppm. Hence, the concentration of surfactant in beverage embodiments of the invention is at least one order of magnitude below a corresponding CMC. However, micelles formed upon initial contact between the sorbic acid pre-microemulsion and water seem to persist in syrup and beverage as the appearance of both remains optically transparent and no sorbic acid precipitation forms over time. Although the inventors do not wish to be bound by theory, this phenomenon can be partially explained by the fact that some of the sorbic acid initially introduced to the syrup is water-soluble and may partition out of the micelle structure into the bulk water phase. Thus, the surfactant micelles are required to disperse only sorbic acid that is not water soluble, and that remains within the micelles (at equilibrium).

Microemulsions also require that the amount of surfactant be several times that of the dispersed substance (sorbic acid, typically in non-aqueous solvent), thereby enabling the surfactant to form droplets that "wrap" around the dispersed substance. However, the concentration of sorbic acid is about 1200 to about 1600 ppm in syrup and about 250 to about 350 ppm in beverages, while, as noted above, the concentration of a surfactant such as Tween is approximately about 30 ppm to about 90 ppm in syrup and about 5 ppm to about 15 ppm in a beverage. Thus, the formation of droplets to wrap around the dispersed sorbic acid is impossible in a large excess of water. Sorbic acid has a lower molecular weight than the surfactants used in the present invention. Therefore, on a molar basis, the concentration difference between the surfactants and the sorbic acid in the concentrate/syrup/beverage is even greater. Although the inventors do not wish to be bound by theory, it is believed that, for all these reasons, the microemulsion does not persist in a syrup or in a beverage.

The microemulsion typically is formed by mixing the components with sufficient agitation for a time sufficient to form the microemulsion. As the microemulsion is self-forming, agitation typically need not be very vigorous. The microemulsion typically is formed in fluid at a temperature of between about 40° F. and less than about the phase invention temperature of the system. More typically, the microemulsion is formed at a temperature between about 50° F. and about 130° F.

The quantity of polysorbate introduced into a syrup from the microemulsion in embodiments of the invention is sufficient to achieve a concentration of polysorbate in the syrup of at least about 0.5 ppm, typically at least about 1 ppm, more typically at least about 2 ppm, and even more typically at least about 5 ppm. The maximum concentration of polysorbate typically effective in embodiments of the invention is less than about 200 ppm, more typically less than about 150 ppm, and more typically less than about 100 ppm. Therefore, typical ranges of polysorbate concentrations are between about 0.5 and about 200 ppm, typically between about 1 and about 100 ppm, and more typically between about 5 and 100 ppm. Typically, the amount of polysorbate in syrup and beverage is minimized because polysorbate also is a foaming agent, which may lead to foam generation, particularly during carbonation. Potential adverse impact on taste by a large concentration of polysorbate also must be considered. Regulations also may limit polysorbate use in some markets.

In accordance with embodiments of the invention, sorbic acid is dissolved in surfactant, or typically into non-aqueous solvent. The skilled practitioner recognizes that sorbic acid is sparingly soluble in water. Thus, typically, sorbic acid is dissolved in a solvent that then is blended with surfactant and optionally a co-solvent to form a pre-microemulsion, which then is introduced into the syrup or beverage.

The concentration of sorbic acid in a beverage typically is less than about 500 ppm. The concentration of sorbic acid in syrup typically is less than about 1500 ppm. In aqueous solution at pH of between about 2.5 and about 4 at about 20° C., typical conditions for beverages and syrups, sorbic acid precipitation begins at sorbic acid concentration of about 500 ppm, unless steps are taken to preclude precipitation, and at 1300 ppm, the tendency to precipitate is magnified. Further, as the skilled practitioner recognizes, other compounds in the beverage or syrup may also affect sorbic acid solubility adversely. For example, hardness lowers the solubility of sorbic acid. Therefore, addition of sorbic acid in a microemulsion in accordance with embodiments of the invention is contemplated at a wide range of sorbic acid concentrations while essentially precluding sorbic acid precipitation.

The concentration of sorbic acid required to achieve commercial preservation conditions also relates to other conditions of the syrup or beverage. For example, lowering the pH and introducing carbonation (which introduced acidity) will decrease the concentration of sorbic acid required to achieve a given preservation performance. Low pH and the presence of carbonation each act as a barrier to microorganism growth and therefore reduce the concentration of sorbic acid required to achieve a given preservation performance. With the guidance provided herein, the skilled practitioner will be able to establish a sorbic acid concentration that suitably preserves a syrup or beverage.

In accordance with embodiments of the invention, syrup and beverages include sorbic acid as preservative. Other preservatives are known to the skilled practitioner, and may be included with the sorbic acid. Other preservatives include, for example, chelators such as the EDTA's, including disodium EDTA, calcium disodium EDTA, and sodium hexametaphosphate (SHMP), and antimicrobials such as benzoates, particularly the alkali metal benzoates; lauric arginate; salts of cinnamic acid; and antioxidants, including tocopherols, BHA, and BHT. In accordance with embodiments of the invention, other preservatives are used sparingly, and most typically not at all. With the guidance provided herein, the skilled practitioner will be able to select appropriate preservatives.

Sweeteners of beverage and syrup embodiments of the invention include caloric carbohydrate sweeteners, natural high-potency sweeteners, synthetic high-potency sweeteners, other sweeteners, and combinations thereof. With the guidance provided herein, a suitable sweetening system (whether a single compound or combination thereof) can be selected.

Examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose, and the like), gentio-oligoscaccharides (gentiobiose, gentiotriose, and gentiotetraose, for example), galacto-oligosaccharides, sorbose, nigero-oligosaccharides, fructooligosaccharides (kestose, nystose and the like), maltotetraol, maltotriol, malto-oligosaccharides (for example, maltotriose, maltotetraose, maltopentaose, maltohexaose, and maltoheptaose), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural, synthetic, and other high-potency sweeteners. As used herein, the phrase "natural high-potency sweetener" means any sweetener found in nature which may be in raw, extracted, purified, treated enzymatically, or any other form, singularly or in combination thereof and characteristically has a sweetness potency greater than sucrose, fructose, or glucose, yet has fewer calories. Non-limiting examples of natural high-potency sweeteners suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, neoastilbin, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I.

Natural high-potency sweetener also includes modified natural high-potency sweeteners. Modified natural high-potency sweeteners include natural high-potency sweeteners which have been altered naturally. For example, a modified natural high-potency sweetener includes, but is not limited to, natural high-potency sweeteners which have been fermented, contacted with enzyme, or derivatized or substituted on the natural high-potency sweetener. In one embodiment, at least one modified natural high-potency sweetener may be used in combination with at least one natural high-potency sweetener. In another embodiment, at least one modified natural high-potency sweetener may be used without a natural high-potency sweetener. Thus, modified natural high-potency sweeteners may be substituted for a natural high-potency sweetener or may be used in combination with natural high-potency sweeteners for any of the embodiments described herein.

As used herein, the phrase "synthetic sweetener" refers to any composition that is not found in nature and is a high potency sweetener. Non-limiting examples of synthetic sweeteners, which also are known as 'artificial sweeteners,' suitable for embodiments of this invention include sucralose, acesulfame potassium (acesulfame K or aceK) or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof.

Acids suitably used in embodiments of the invention include food grade acids typically used in beverages and beverage syrups. Buffers include salts of food grade acids that form pH buffers, i.e., provide a combination of compounds that tends to maintain the pH at a selected level. Food acids for use in particular embodiments include, but are not limited to, phosphoric acid, citric acid, ascorbic acid, adipic acid, fumaric acid, lactic acid, malic acid, tartaric acid, acetic acid, oxalic acid, tannic acid, caffeotannic acid, and combinations thereof.

Flavors routinely used in beverages and syrups are suitably used in beverages and syrups that are embodiment of the invention. The skilled practitioner recognizes that some flavors will haze or add a cloudy appearance to a beverage. Therefore, such a flavor, which often may be an emulsion, would not be suitably used in a clear beverage. Suitable flavors include flavors typically used in beverages and syrup that are not incompatible with the type of beverage. That is, a clear beverage would not typically be flavored with a flavor that would cloud the beverage, introduce haze, or otherwise make the beverage less attractive to the consumer. However, subject to this condition known to the skilled practitioner, known flavors suitably are used, as appropriate.

Any flavor, flavor compound, or flavor system consistent with the type of beverage suitably is used in embodiments of the invention. Further, the flavor may be in any form, such as powder, emulsion, micro-emulsion, and the like. Some of these forms may induce clouding in a beverage, and so would not be used in a clear beverage. Typical flavors include almond, amaretto, apple, sour apple, apricot, nectarine, banana, black cherry, cherry, raspberry, black raspberry, blueberry, chocolate, cinnamon, coconut, coffee, cola, cranberry, cream, irish cream, fruit punch, ginger, grand marnier, grape, grapefruit, guava, grenadine, pomegranate, hazelnut, kiwi, lemon, lime, lemon/lime, tangerine, mandarin, mango, mocha, orange, papaya, passion fruit, peach, pear, peppermint, spearmint, pina colada, pineapple, root beer, birch beer, sarsaparilla, strawberry, boysenberry, tea, tonic, watermelon, melon, wild cherry, and vanilla. Exemplary flavors are lemon-lime, cola, coffee, tea, fruit flavors of all types, and combinations thereof.

Surfactants other than polysorbate also may be present in the syrup or beverage may be added as an ingredient of the syrup. The skilled practitioner recognizes that surfactant also may be introduced into the syrup or beverage as part of a component ingredient. Surfactants typically suitable for use in embodiments of this invention include, but are not limited to, sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other surfactants.

The skilled practitioner recognizes that ingredients can be added singularly or in combination. Also, solutions of dry ingredients can be made and used to conveniently add ingredients to the bulk quantity of water.

The skilled practitioner recognizes that, if a temperature higher than ambient temperature is used during syrup manufacture, the temperature of the syrup may be reduced after the product is complete, or, typically, after acidification and before volatile materials are added. Typically, beverage syrup is made by adding ingredients to a bulk quantity of water. The water typically is at a temperature of at least about 50° F. and typically less than about 200° F., commonly between about 50° F. and about 160° F., and typically between about 50° F. and about 130° F. Although beverage and syrup may be made at a temperature higher than the phase inversion temperature of the microemulsion described in embodiments of the invention herein, the microemulsion is not added until the temperature of the fluid to which the microemulsion is being added is below the phase inversion temperature. In this way, the droplets containing sorbic acid remain small and do not impart haze or cloudiness to syrup or a beverage. Typically, for a microemulsion made with polysorbate, the phase inversion temperature is less than about 130° F. However, the skilled practitioner recognizes that the phase inversion temperature is related to not only the surfactant used to form the microemulsion but also the composition of the syrup or beverage. For example, a higher concentration of surfactants may raise the phase inversion temperature. The presence of oil-based flavor also may affect the phase inversion temperature of the sorbic acid microemulsion. With the guidance provided herein, the skilled practitioner will be able to determine the phase inversion temperature, above which the microemulsion typically is not added to the beverage.

Ingredients typically are added to the bulk quantity of water in an order that minimizes potential adverse interactions between ingredients or potential adverse effect on an ingredient. For example, nutrients that are temperature-sensitive might be added during a relatively low-temperature portion toward the end of the manufacturing process. Similarly, flavors and flavor compounds often are added just before completion of the syrup to minimize potential loss of volatile components and to minimize flavor loss in any form. Often, acidification is one of the last steps, typically carried out immediately before temperature-sensitive, volatile, and flavor materials are added. Thus, flavors or flavor components or other volatile materials and nutrients typically are added at an appropriate time and at an appropriate temperature. With the guidance provided herein, the skilled practitioner can identify an appropriate time to introduce flavor and other volatile materials.

Any of these or other orders of ingredient addition are suitably used, as the order in which ingredients are added can be determined by the skilled practitioner with the guidance provided herein. Thus, the sorbic acid-containing microemulsion can be added to the bulk solution at any time, subject to the temperature limitation already described.

The resulting syrup is packaged and may be stored. Syrup may be used essentially immediately to manufacture beverages, which typically are packaged for distribution. Syrup also may be distributed to bottlers, who package beverages made by addition of water and perhaps other materials like carbonation. Typically, the throw is 1+5. Also, syrup typically is sold to those who mix the syrup with throw water, and perhaps other ingredients, such as carbonation, for immediate consumption. One example of such a preparation is a 'fountain soft drink.'

Other embodiments of the invention are directed to manufacture of stable preserved ready-to-drink beverages. Such beverages are made by mixing an aliquot of syrup with an appropriate quantity of diluting water. Typically, the ratio of 1 volume of syrup with 5 volumes of water or other fluid, also known as a "1+5 throw", is used.

Syrup embodiments of the invention are stable beverage syrups preserved with sorbic acid having a shelf life of at least about one week at room temperature. More typically, syrup embodiments of the invention have a shelf life of at least about 4 weeks, and even more typically at least about 20 weeks.

Beverage embodiments of the invention are stable beverages preserved with sorbic acid having a shelf life of at least about 10 weeks at a temperature between about 40° F. and about 110° F. More typically, beverage embodiments of the invention have a shelf life of at least about 20 weeks, and even more typically at least about 6 months.

The following examples illustrate, but do not limit, the invention.

EXAMPLE 1

Lemon lime flavored syrup, and beverage made therefrom using 1+5 throw, are made. A bulk quantity of water at a temperature between about 50° F. and 200° F. is charged to a stirred tank and agitation is started.

Ingredients such as buffers, sweeteners, anti-foam agents, and nutrients are added to the bulk quantity of water. The ingredients are added as solid, liquid, solution, emulsion, or in any form. Solids are dissolved in fluid to form a solution, suspension, or other aqueous combination. Acids then are added to the bulk solution with continuing agitation.

A microemulsion of sorbic acid and ethanol with polysorbate 20 surfactant is made in water. The quantity of sorbic acid added is sufficient to provide a sorbic acid concentration of 0.12 weight percent in the syrup. This microemulsion is added to the bulk solution with continuing agitation at a temperature below the phase inversion temperature of the microemulsion in the syrup.

The temperature of the bulk solution then is lowered to less than about 120° F., if necessary, and lemon lime flavor is added with continuing agitation. After thorough blending, additional top-off water required to achieve the desired volume is added and agitation continues until the syrup is thoroughly mixed. The syrup then is cooled to ambient temperature, if necessary.

Syrup thus prepared is a clear syrup for a fresh-tasting beverage. The syrup is stored at room temperature for 1 week. The syrup remains clear and without any solid precipitate, sediment, crystal, floc, cloud, or haze.

An aliquot of syrup thus prepared is diluted with 5 aliquots of throw water ("1+5 throw") to produce fresh-tasting lemon lime flavored clear beverage. The beverage is stored at room temperature for 10 weeks, and remains clear and without any solid precipitate, sediment, crystal, floc, cloud, or haze.

EXAMPLE 2

Lemon lime flavored syrup, and beverage made therefrom using 1+5 throw, are made in accordance with the method of Example 1, except that the microemulsion is made using propylene glycol and is added to the bulk quantity of water before the other ingredients are added.

Syrup thus prepared is a clear syrup for a fresh-tasting beverage. The syrup is stored at room temperature for 4 weeks. The syrup remains clear and without any solid precipitate, sediment, crystal, floc, cloud, or haze.

An aliquot of syrup thus prepared is diluted with 5 aliquots of throw water ("1+5 throw") to produce fresh-tasting lemon lime flavored clear beverage. The beverage is stored at room temperature for 6 months, and remains clear and without any solid precipitate, sediment, crystal, floc, cloud, or haze.

EXAMPLE 3

Lemon lime flavored syrup, and beverage made therefrom using 1+5 throw, are made in accordance with the method of Example 1, except that buffers are added to the microemulsion.

Syrup thus prepared is a clear syrup for a fresh-tasting beverage. The syrup is stored at room temperature for 4 weeks. The syrup remains clear and without any solid precipitate, sediment, crystal, floc, cloud, or haze.

An aliquot of syrup thus prepared is diluted with 5 aliquots of throw water ("1+5 throw") to produce fresh-tasting lemon lime flavored clear beverage. The beverage is stored at room temperature for 6 months, and remains clear and without any solid precipitate, sediment, crystal, floc, cloud, or haze.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, other clear beverages are made in embodiments of the invention, and other non-aqueous solvents are used in embodiments of the invention.

We claim:

1. A method for reducing sorbic acid precipitation during manufacture and storage of stable preserved syrup, said method comprising
    (a) forming a microemulsion comprising sorbic acid, a non-aqueous solvent, and surfactant,
    (b) combining syrup ingredients in a bulk quantity of liquid, wherein the ingredients are selected from the group consisting of acids, buffers, sweeteners, surfactants, anti-foaming agents, colors, taste modifiers, nutrients, and mixtures thereof, and
    (c) adding the microemulsion to the liquid; wherein the concentration of sorbic acid in the syrup is about 1200 to about 1600 ppm and the concentration of the surfactant in the syrup is about 30 ppm to about 90 ppm.

2. The method of claim 1, wherein the non-aqueous solvent is selected from the group consisting of propylene glycol, ethanol, citric acid, benzylalcohol, triacetin, limonene, vegetable oils, medium chain triglycerides, citrus flavor oil, and blends thereof.

3. The method of claim 1, wherein the microemulsion further comprises a co-solvent miscible with water and the non-aqueous solvent.

4. The method of claim 3, wherein the co-solvent is selected from the group consisting of propylene glycol and ethanol in 60:40 combination, ethanol and citric acid in 90:10 combination, and blends thereof.

5. A method for reducing sorbic acid precipitation during manufacture and storage of a stable preserved beverage prepared by diluting stable preserved syrup, said method comprising
    (a) forming a stable preserved syrup by
        (1) forming a microemulsion comprising sorbic acid, a non-aqueous solvent, and surfactant,
        (2) combining syrup ingredients in a bulk quantity of liquid, wherein the ingredients are selected from the group consisting of acids, buffers, sweeteners, surfactants, anti-foaming agents, colors, taste modifiers, nutrients, and mixtures thereof, and
        (3) adding the microemulsion to the liquid, and
    (b) mixing the stable preserved syrup with fluid in a quantity sufficient to make the stable preserved beverage; wherein the concentration of sorbic acid in the beverage is about 250 to about 350 ppm and the concentration of the surfactant in the beverage is about 5 ppm to about 15 ppm.

6. The method of claim 5, wherein the non-aqueous solvent is selected from the group consisting of propylene glycol, ethanol, citric acid, benzylalcohol, triacetin, limonene, vegetable oils, medium chain triglycerides, citrus flavor oil, and blends thereof.

7. The method of claim 5, wherein the microemulsion further comprises a co-solvent miscible with water and the non-aqueous solvent.

8. The method of claim 7, wherein the co-solvent is selected from the group consisting of propylene glycol and ethanol in 60:40 combination, ethanol and citric acid in 90:10 combination, and blends thereof.

* * * * *